Sept. 25, 1934.  G. L. WALKER  1,975,029

METHOD OF MAKING TORCH TIPS

Filed Oct. 2, 1930

INVENTOR
George L. Walker
BY
ATTORNEY

Patented Sept. 25, 1934

1,975,029

UNITED STATES PATENT OFFICE 1,975,029

METHOD OF MAKING TORCH TIPS

George L. Walker, New York, N. Y., assignor to Air Reduction Company, Incorporated, New York, N. Y., a corporation of New York Application October 2, 1930, Serial No. 485,972

11 Claims. (Cl. 29—157)

The object of this invention is to provide a very simple and economical method of producing superior oxyacetylene or oxy-fuel gas torch tips, more especially cutting tips, and to make it practicable to manufacture tips of improved operating characteristics, which, except for this method, could be obtained only at relatively high cost of production, if at all.

The particular object of the invention is to provide a cheap and satisfactory method of producing tips having relatively large mixing chamber passages and relatively small flame orifices, and more especially tips in which the flame orifices have straight, parallel walls connected with the mixing passages by tapering appnected with the mixing passages by tapering approach passages. Such tips have important functional advantages, but are either expensive or impossible to make by ordinary drilling and reaming methods. In one-piece tips having metering ports for the oxygen and fuel gas at the rear end, and in which, consequently, the mixing passages can not be drilled from the rear end, it would be impossible to make passages and orifices such as have been described by drilling and reaming. The invention is useful, therefore, in the manufacture of one-piece tips having the mixing and proportioning provisions in the tip, though it is not restricted to tips of this class. The object of the invention is not alone to avoid difficult, uncertain or impossible drilling operations but also to produce tips having the important features of internal formation which have been referred to.

Another advantage of the invention is that the method makes it possible to obtain, simultaneously with other beneficial results, a desirable convergence of the preheating flame orifices inward toward the oxygen cutting jet. By bending or deflecting the forward portions of the preheating mixture passages at inclinations to the main portions of the passages, a greater convergence of the flame orifices is obtainable than would result if the passages were made straight and slightly inclined throughout the length of the tip. As illustrated herein, the original passages may be drilled in parallelism, and still convergence may be obtained. By drilling alone it would be difficult to make convergent flame orifices meeting the main passages at an angle, and by drilling and reaming it would scarcely be possible to form small flame orifices and tapering approach passages in angular relation to long supply passages or mixing chambers.

The stated objects are accomplished by first making or providing tip blanks not much shorter than the finished tips are to be and having relatively large mixing passage bores extending to and through their front ends. These bores, because of their size, can be drilled with ease. Then small mandrels or wires are placed in these bores, or in their outlet portions, and the forward end of the tip is swaged or otherwise compressed or elongated to close the forward portions of the bores only in upon the mandrels. The effect of this is to form small parallel-walled orifice passages in contact with the mandrels, with large mixing passage chambers behind the orifices. The swaging or like operation is preferably so conducted that the bores are drawn in gradually from the full diameter to the reduced diameter determined by the mandrels, thus automatically creating the tapered approach passages. Automatically, also, the flame orifices and the tapered approach passages are deflected inward toward the axis of the tip. Because of this method of manufacture, the large and small portions of the passages always merge smoothly, a result which could scarcely be duplicated by drilling with the greatest care.

In the accompanying drawing, forming part hereof:

Figure 1:
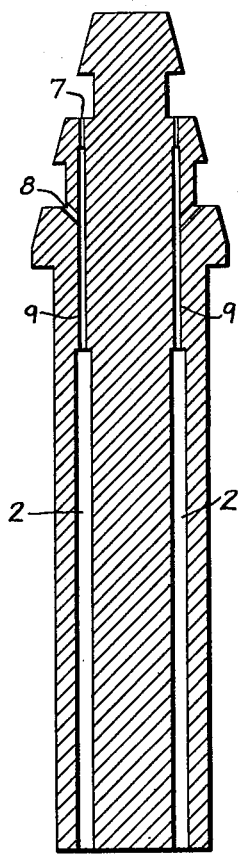
Fig. 1 is a longitudinal section through a tip partially prepared for the purpose of the process.
Figure 2:
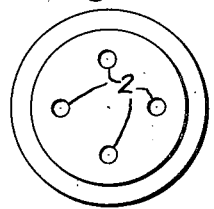
Fig. 2 is a front end view thereof.

I first make a tip as shown in Figs. 1 and 2, having a suitable rear end for seating in the torch head and one or more mixed gas passages 2 drilled from the front end. These passages are considerably larger than the eventual terminal orifices for delivering the preheating jets, and their size is the size intended for the mixing chambers.

Mandrels 3 are now inserted in the forward ends of these bores, and the front end of the tip is then reduced by swaging, rolling, forging or like process. This operation contracts the outlets of the passages to the size of the mandrels.

The mandrels are then removed, after which the cutting oxygen passage 4 is drilled, preferably by counter-boring. There is an advantage in forming the cutting oxygen passage by drilling after the preheating flame orifices have been formed by swaging the front end of the tip. This combination and order of steps constitute the most expeditious and economical way of producing a cutting tip having large mixing chambers, small preheating flame orifices and a relatively large cutting oxygen orifice.

Figure 3:
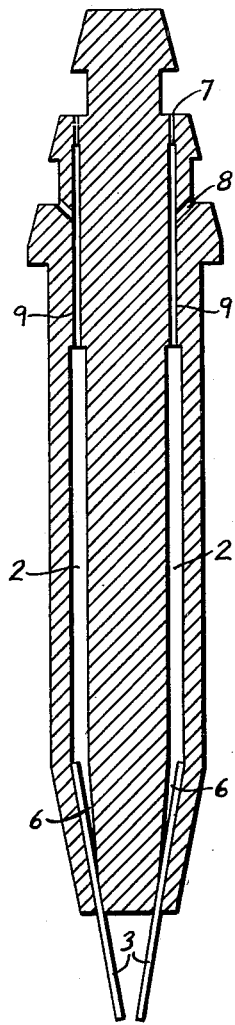
Fig. 3 is a longitudinal section showing the front end of the tip reduced as by swaging and the mandrels in place.
Figure 5:
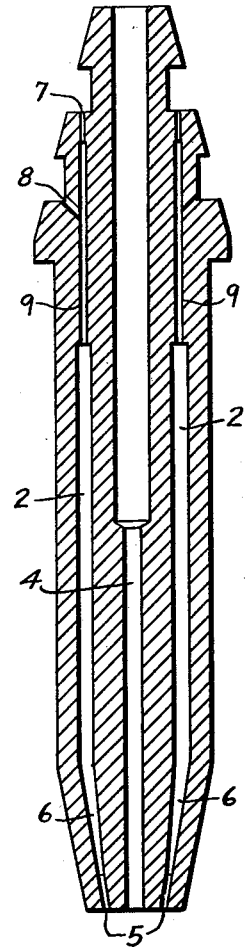
Fig. 5 is a longitudinal section of the tip after the cutting jet passage has been drilled.
Figure 4:
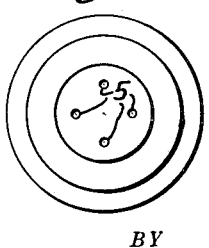
Fig. 4 is an end view of the tip at this stage.
Figure 6:
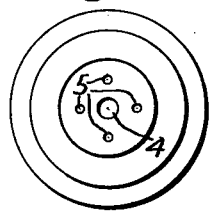
Fig. 6 is an end view of the same.
Figure 7:
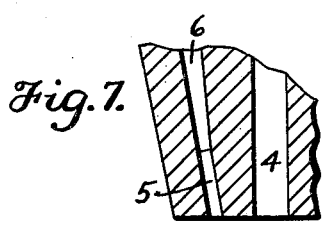
Fig. 7 is a fragmentary sectional view showing a preheating jet orifice and its tapered approach passage on an enlarged scale.

The reduced outlet orifices 5 of the preheating passages are preferably straight for a distance about two to eight times the diameter of the orifices, and behind this the reduction of the metal produces long tapering approach passages 6, where the walls of the passages did not clasp the mandrels, which approach passages gradually narrow the flow from the broad mixing chambers 2 to the outlets. The convergence of the relatively small flame orifices 5 and their approach passages 6, created by the reduction of the front end of the tip, is clearly shown in Figs. 3 and 5 and also in Figs. 4 and 6 contrasted with Fig. 2.

The metering ports 7 and 8 for controlling the admission of oxygen and acetylene or other fuel gas, respectively, to the mixing passages 2 may be drilled before or after the reduction of the forward end of the tip. The mixing chamber passages 2 may be drilled full width back to the metering ports 7, but in making tips of the larger powers it is preferable to make the rear portions 9 of these passages with drills of smaller size than the drills used for the enlarged chambers 2, such narrower rear portions extending for a distance in front of the metering ports 8.

The orifices 5 may be of any cross-sectional shape determined by the mandrels.

Tips made by this method have numerous advantages over more conventional tips. The advantages result from the relatively small parallel-walled delivery orifices of substantial length, the relatively large mixing chambers, and the tapered approach passages. Among these advantages are: thorough mixing of the gases, the delivery of long or pointed flames, increased flame velocity, reduced operating pressures, quicker preheat for starting cutting operations, reduced gas flows or more effective preheating for a given gas flow, greater visibility of the cutting operation because of the flame characteristics and the distance at which the tip can be held from the work, less heating up of the tip, a wide range of gas flows at which the tips can be operated without flashing back or without blowing the flames away, the ability to provide cutting tips with a greater number of relatively small preheating orifices than would otherwise be practicable, and the ease with which very fine flame orifices can be made. Some of these, and other advantages, are useful in welding tips. The method is of maximum value for the manufacture of cuttings tips having numerous preheating passages.

The parallel-walled delivery orifices of substantial length are highly important for good operation. The enlarged mixing chambers give better mixing and more efficient preheating and contribute to the production of the desired flame characteristics, as do also the tapered approach passages.

I claim:

1. A method for the manufacture of torch tips, said method being to provide a partly manufactured tip having a relatively large mixing passage bore, then to place a relatively small parallel-sided mandrel in this bore, and then to reduce the forward end of the tip so as to close the forward portion only of said bore in against the mandrel, after which the mandrel is removed, whereby a parallel-walled flame orifice of substantial length and a relatively large mixing chamber are obtained, the reducing operation being so conducted that the reduction of the metal causes the wall of the bore, where it does not clasp the mandrel, to assume the form of a long tapering approach passage in order to narrow the passage gradually from the mixing chamber to the flame orifice.

2. A method for the manufacture of torch tips, which comprises providing a tip blank not much shorter than the finished tip, drilling a relatively large mixing passage bore from the front end of the blank toward but not through the rear end of the tip, drilling, at this time or subsequently, oxygen and fuel gas inlet ports in the rear end of the tip, placing a relatively small parallel-sided mandrel in the mixing passage bore, reducing the forward end of the tip so as to close the forward portion only of said bore against the mandrel, and then withdrawing the mandrel from the front end of the tip, leaving a parallel-sided flame orifice supplied from a relatively large mixing chamber between said inlet ports and said orifice.

3. A method for the manufacture of torch tips, which comprises providing a tip blank not much shorter than the finished tip, drilling a relatively large mixing passage bore from the front end of the blank toward but not through the rear end of the tip, drilling a smaller throat passage rearward from the large passage nearer to the rear end of the tip, drilling, at this time or subsequently, oxygen and fuel gas inlet ports in the rear end of the tip to communicate with said throat passage, placing a relatively small parallel-sided mandrel in the forward portion of the large bore, reducing the forward end of the tip so as to close the forward portion only of said bore against the mandrel, and then withdrawing the mandrel from the front end of the tip, leaving a parallel-sided flame orifice supplied from a relatively large mixing chamber between said inlet ports and said orifice.

4. A method for the manufacture of cutting torch tips, which comprises providing a tip blank not much shorter than the finished tip, drilling a number of relatively large mixing passage bores in this blank, placing relatively small parallel-sided mandrels in these bores, reducing the forward end of the tip so as to close the forward portions only of all said bores, for a distance several times the diameter of the mandrels, against the mandrels, and then removing the mandrels, leaving parallel-sided orifices communicating with relatively large mixing chambers.

5. A method for the manufacture of cutting torch tips, which comprises providing a tip blank not much shorter than the finished tip, drilling a number of relatively large mixing bores in this blank, toward but not to the extreme rear end, drilling, at this time or subsequently, individual oxygen and fuel gas inlet ports in the rear end of the tip to communicate with said bores, placing relatively small parallel-sided mandrels in the forward portions of the mixing passage bores, reducing the forward end of the tip so as to close the forward portions only of said bores against the mandrels, and withdrawing the mandrels from the front end of the tip, leaving parallel-walled preheating flame orifices supplied by enlarged mixing chambers between said ports and said orifices.

6. A method for the manufacture of cutting torch tips, which comprises providing a tip blank not much shorter than the finished tip, drilling a number of relatively large mixing passage bores in this blank, placing relatively small parallel-sided mandrels in these bores, reducing the forward end of the tip so as to close the forward portions only of all said bores against said mandrels and to cause the walls of the bores, where they do not clasp the mandrels, to taper gradually, and then removing the mandrels, whereby the cutting tip is provided with relatively large mixing chambers, relatively small parallel-sided flame orifices, and tapered approach passages gradually reducing the passages from the full area of the mixing chambers to the straight orifices.

7. A method for the manufacture of cutting torch tips, which comprises providing a tip blank not much shorter than the finished tip, drilling a number of relatively large mixing bores in this blank, toward but not to the extreme rear end, drilling, at this time or subsequently, individual oxygen and fuel gas inlet ports in the rear end of the tip to communicate with said bores, placing relatively small parallel-sided mandrels in the forward portions of the mixing passage bores, reducing the forward end of the tip so as to close the forward portions only of said bores against the mandrels and to cause the walls of the bores, where they do not clasp the mandrels, to taper gradually to parallel-sided flame orifices, and then withdrawing the mandrels from the front end of the tip.

8. A method for the manufacture of cutting torch tips, which comprises drilling a number of relatively large bores about the axis of a tip blank, inserting relatively small parallel-sided mandrels into the forward portions of these bores, reducing the forward end of the tip blank so as to close the forward portions only of these bores against the mandrels, and then withdrawing the mandrels from the front end of the tip, leaving a group of small parallel-sided preheating flame orifices forming exits from large chambers.

9. A method for the manufacture of cutting torch tips, which comprises forming a number of relatively large passages in a tip blank, placing relatively small parallel-sided mandrels in these passages, reducing the forward end of the tip blank so as to close the forward portions only of these bores against the mandrels, then withdrawing the mandrels, leaving a group of small parallel-sided preheating flame orifices forming exits from large chambers, and thereafter drilling a cutting oxygen passage through the tip.

10. A method for the manufacture of cutting torch tips, which comprises providing a tip blank with several relatively large passages disposed about its axis and entirely surrounded by metal of the blank, thereafter inserting relatively small mandrels in these passages, then reducing the forward end of the tip blank in such manner that the forward portions only of all said passages are closed upon and caused to conform to said mandrels over a substantial distance, while the portions of the passages next behind are made to taper in gradually toward the mandrels, and then withdrawing the mandrels, leaving relatively narrow orifices connected by tapered approach passages with relatively large chambers.

11. A method for the manufacture of cutting torch tips, which comprises providing a tip blank with several relatively large passages disposed about its axis and entirely surrounded by metal of the blank, thereafter inserting relatively small parallel-sided mandrels into these passages, and then, by reducing the forward end of the blank, causing the forward portions of said passages to bend inward toward the axis of the blank and to taper until they close in against the mandrels, after which the mandrels are removed, leaving relatively narrow inwardly deflected exit orifices with tapering approach passages connecting them smoothly with relatively large chambers.

GEORGE L. WALKER.